Patented Jan. 19, 1937

2,068,424

UNITED STATES PATENT OFFICE 2,068,424

PRODUCTION OF POLYMERIZATION PRODUCTS

Hermann Mark, Vienna, Austria, and Hans Fikentscher, Josef Hengstenberg, and Georg v. Süsich, Ludwigshafen-on-the-Rhine, Germany, assignors to I. G. Farbenindustrie Aktiengesellschaft, Frankfort-on-the-Main, Germany No Drawing. Application December 13, 1932, Serial No. 646,980. In Germany December 15, 1931

11 Claims. (Cl. 260—2)

The present invention relates to the production of polymerization products.

We have found that in the polymerization of vinyl halides, that is vinyl chloride, bromide and iodide, polymerization products of particularly good properties can be obtained by carrying out the polymerization of the vinyl halides in the form of aqueous emulsions.

The aqueous emulsions of the vinyl halides may be prepared in the manner usual for the production of emulsions for example with the aid of turbo mixers or homogenizing machines; generally, stirring the said halides into water to which any of the so-called and well known dispersing and/or emulsifying agents are preferably added is, however, quite sufficient. Vinyl chloride is gaseous at room temperature and vinyl bromide has a low boiling point too (about 16° C.); therefore the emulsification of these substances is carried out by mechanical treatment such as stirring, shaking, etc. in closed vessels, i. e. under increased pressure.

The polymerization of the resulting aqueous emulsions may be carried out by heating, for example, to temperatures of from about 35° to about 80° C., or by irradiation with chemically active rays, such as sunlight or light from a mercury vapour lamp, or a combination of these means, polymerization accelerators such as nascent oxygen in the form of inorganic peroxides, for example ozone or hydrogen peroxide, lithium, potassium or sodium perborates and persulphuric acid, or of organic peroxides, such as acetyl or benzoyl peroxides, peracetic acid, perbenzoic acid or acetone peroxide being added, if so desired.

When working on a large, technical scale, it is advantageous to introduce the aqueous emulsion into the vessel in which the polymerization takes place at the rate at which the polymerization proceeds, a very convenient regulation of the course of the polymerization being thus possible. It is also possible to introduce the vinyl halide, while stirring, into the aqueous liquid employed for producing the emulsion at the rate at which the polymerization proceeds.

In order to avoid any separation of the emulsion into its components during the polymerization the emulsion is preferably continuously kept in motion during the polymerization by stirring, shaking or pumping it in circulation.

The aforesaid dispersing and emulsifying agents which are preferably added to the water employed for preparing the emulsions may be chosen from all the known dispersing, emulsifying, wetting, soaping or washing agents, such as alkali metal, ammonium and amine salts of fatty acids containing at least 12 carbon atoms, for example sodium, potassium or ammonium palmitate or stearate, Marseilles soap, or mono-, di- or triethanol amine salts of lauric or palmitic acid, salts of true sulphonic acids or of acid sulphuric esters of organic compounds containing at least 8 carbon atoms, such as those of alkyl naphthalene sulphonic acids, for example mono- and di- (normal or iso) butyl naphthalene sulphonic acids, mono- and di- (normal or iso) propyl naphthalene sulphonic acids, of true sulphonic acids from oleic or palmitic acids, or salts of acid sulphuric esters of fatty alcohols containing at least 12 carbon atoms, such as dodecyl alcohol, tetradecyl alcohol or cetyl alcohol, or salts of true sulphonic acids of such alcohols, such as for example the sodium salt of hydroxy octodecane sulphonic acid, obtainable by acting with acetic anhydride and sulphuric acid monohydrate on octodecylene. Examples of specifically suitable emulsifying agents are the sodium salts of N-oleic-N-alkyl taurides (obtainable according to the British specification No. 341,053), of N-oleic tauride (obtainable according to the British specification No. 343,899), of the fatty esters of hydroxyl alkyl sulphonic acids (obtainable according to the British specification No. 366,916), for example the sodium salt of the oleic ester of hydroxyethane sulphonic acid, and the sodium salts of fatty acid esters of hydroxycycloalkyl or -aryl sulphonic acids (obtainable according to the British specification No. 367,-585).

By adding to the emulsions small amounts, such as for example from 0.5 to 3 per cent, by weight of the aqueous liquid, of acid reacting agents, such as acetic or boric acid, or mixtures thereof with buffer salts, that is of salts capable of preventing appreciable changes in the hydrogen-ion concentration of aqueous solutions, or to adjust the hydrogen-ion concentration of the solutions to the desired value, such as for example lithium acetate or borate, or of primary sodium phosphate alone; more soluble and paler products are generally speaking obtained than when working in the absence of such substances. Preferably, the hydrogen-ion concentration is adjusted to between pH=about 1.5 and pH=about 5, the best results being obtained with pH=between about 2.5 and about 3. It is possible to combine the adjusting of the pH value with the addition of the polymerization catalysts, for example by employing a solution of the said catalysts in glacial acetic acid.

The vinyl halides may be polymerized alone or in admixture with each other; vinyl chloride being the cheapest of said halides, it will be mainly employed for commercial purposes. Since vinyl chloride is gaseous already at room temperature, working in closed vessels is necessary. It is, however, also very advantageous to polymerize the vinyl halides, especially vinyl chloride, together with monomeric vinyl carboxylates which take part in the polymerization, thus interpolymerizing the said bodies. The said carboxylates may be chosen for example from vinyl acetate, vinyl propionate, vinyl butyrate and vinyl chloracetate, as well as from vinyl esters of mixed aliphatic-aromatic carboxylic acids, such as the vinyl ester of phenyl acetic acid. The amount of the said carboxylates may be as small or as large as desired, particularly valuable products being, however, obtained by employing from about 10 up to 50 per cent, preferably up to about 43 per cent, by weight, of the vinyl chloride, of said vinyl carboxylates, the best products resulting from such emulsions in which about 80 parts (by weight) of vinyl chloride are polymerized together with about 20 parts of vinyl carboxylate.

In order to obtain more flexible products it is advantageous to add organic softening agents, such as phosphoric esters, for example tri-n-butyl phosphate or triphenyl phosphate, phthalic esters, such as di-n-propyl or n-butyl phthalate or di-(ethylene glycol mono-methyl ether) phthalate, camphor or ethyl or propyl ethers of glycerine, to the vinyl halides, or to the mixtures thereof with the above mentioned carboxylates, before or during the polymerization. These additions also prove useful in the further working up of the polymerization products; it is also possible to incorporate the said softening agents to the finished polymerization products, in order to facilitate any mechanical operation to which they are ultimately subjected.

As already stated, the polymerization is usually carried out at between about 35° and about 80° C.; generally speaking, a temperature of about 40 to about 50° C. will be preferred if products giving highly viscous solutions are desired, since the viscosity of the solutions of the polymerization products is generally low when the polymerization has been carried out at comparatively high temperatures, such as 70° or 80° C. or more. The mechanical properties, such as tensile elasticity and tenacity of the products obtained at low temperatures are generally better than those of products prepared at high temperatures.

The polymerization products may be separated from the aqueous liquids which have served for the emulsification and in which they are still dispersed after polymerization, by coagulation with inorganic, non-oxidizing acids, such as sulphuric, phosphoric or hydrochloric acids, with salts such as sodium chloride, magnesium chloride, or especially water-soluble aluminium salts such as alum, aluminium phosphate and aluminium chloride, or with low molecular, aliphatic monohydric alcohols, such as methyl alcohol or ethyl alcohol, aluminium salts being preferably employed; it is also possible to separate the polymerization products by freezing out, i. e. by cooling the aqueous dispersions to temperatures below zero centigrade, such as 5° or 8° below 0° C., or by cataphoresis.

The aqueous dispersions of the polymerization products may also serve directly for varnishing, impregnating, or coating fabrics, leather, wood or metal, by spraying, brushing or dipping, any desired additions of softening agents (already enumerated above), fillers, such as cork meal, soot or bentonite, or pigments, such as lakes from Lithol Red, Indanthrene Blue, zinc oxide or colcothar, being added, if desired, in an emulsified or dispersed form.

The polymerization products may be used alone as substitutes for, or as additions to, organic, film forming substances of high molecular weight, such as cellulose esters or ethers, for example cellulose nitrate, or benzyl cellulose, or to rubber or rubber-like polymerization products of olefines, for example polymerization products of butadiene, for the preparation of threads, films, coatings, lacquers, varnishes or pressed, die- or injection-molded articles, electric insulating material and celluloid-like articles; the articles formed from polymerized vinyl chloride alone are superior to celluloid by reason of their incombustibility.

The polymerization of the vinyl halides or of mixtures thereof with the aforesaid vinyl carboxylates is very advantageous in many respects when it is carried out, according to the present invention, in the form of aqueous emulsions. In contrast to the compact polymerization products obtained by polymerizing in the absence of water as emulsifying agent or in the presence of organic solvents alone, that is in the form of solutions, the loose, granular or pulverulent polymerization products resulting from the present process may very readily be freed from any residual monomeric compounds or decomposition products by simple treatment with steam. The products purified in this manner are distinguished from those obtainable by polymerization in organic solvents or in compact form by their complete lack of odour, their paler colour and their greater fastness to light and heat. A further advantage of the polymerization in the form of aqueous emulsions consists in the fact that the products are first obtained in the form of a latex-like liquid which may very easily be withdrawn from the polymerization vessel, in contrast to the products obtained according to the other methods which stick to the walls of the apparatus and to the stirring devices. The latex thus obtained may directly be employed for coating purposes without coagulation, this being very convenient for many purposes. On the other hand, the powders obtainable by coagulating the latex may very readily be freed from any impurities by washing with aqueous solutions of alkali, such as ammonia or alkali metal hydroxide, such as sodium or potassium hydroxide, the products resulting from the further working up of the purified powder being much more resistant to decomposition and discolouration on heating than the products polymerized in another way. Moreover, the fine powders dissolve much more easily in organic solvents, as for example halogenated hydrocarbons, such as methylene chloride, tetrachlorethane, ethylene chlorhydrin, mixtures of acetone and toluene or of acetone and benzene, or n-butyl acetate, than the compact masses obtained according to other processes of polymerization. A further advantage over the polymerization in compact form consists in the possibility of very conveniently maintaining the desired temperature and of completely preventing any local superheating. The polymerization in aqueous emulsions is also advantageously distinguished from polymerization in organic solvents by its cheapness, especially since organic solvents are very strongly retained by the polymerization products. Finally, the yield of polymerization products is about the double of that of the ordinary polymerization methods, i. e. from 80 to 90 per cent against from 40 to 50 per cent.

In order to obtain products which are particularly fast to light, it is preferable to carry out the polymerization in the absence of iron, for example in enamelled vessels and apparatus. The same result can also be obtained by removing any iron from the polymerization product, which may be effected for example by washing with aqueous oxalic acid.

The following examples will further illustrate the nature of this invention but the invention is not restricted to these examples.

*Example 1*

A mixture of 100 kilograms of vinyl chloride and 5 kilograms of a 10 per cent solution of peracetic acid in glacial acetic acid is allowed to flow slowly at the rate at which polymerization proceeds from a reservoir under a pressure of 4 atmospheres, while stirring, into a closed vessel containing a solution of 1.5 kilograms of N-methyl N-oleic tauride sodium salt and 3 kilograms of lithium borate in 3000 kilograms of water, heated to about 50° C. The pressure in the polymerization vessel rises to about 7 atmospheres, the pressure in the reservoir being then compensated therewith by combining the free spaces of both vessels. After about 48 hours, the resulting latex-like dispersion is coagulated by means of 50 kilograms of an aqueous 4 per cent solution of sulphuric acid. The pulverulent white coagulate obtained is soluble in organic solvents, as for example acetone, chlorobenzene and methylene chloride.

*Example 2*

10 kilograms of di-ethyl mono-(ethylene glycol n-butyl ether) phosphate

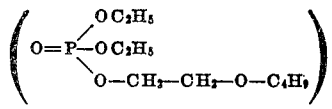

are mixed with 90 kilograms of monomeric vinyl chloride. The mixture is emulsified by means of a turbo mixer in 250 kilograms of water containing 0.5 per cent by weight of Turkey red oil, 1 per cent by weight of lithium borate and 2 per cent by weight of a 30 per cent aqueous hydrogen peroxide solution. The resulting emulsion is heated at 50° C. for about 30 hours in a closed vessel until the polymerization is completed. The latex-like dispersion thus obtained is coagulated by means of an aqueous 2 per cent solution of sulphuric acid and the resulting coagulate may be readily pressed into moulds and is soluble in organic solvents, such as acetone or halogenated hydrocarbons, for example in methylene chloride, chlorobenzene, chlorotoluene.

*Example 3*

A mixture of 75 kilograms of vinyl chloride and 25 kilograms of vinyl acetate are emulsified in 300 kilograms of water containing 5 kilograms of the sodium salt of hydroxy-octodecane sulphonic acid. 5 kilograms of a 10 per cent solution of peracetic acid in glacial acetic acid are then added to the emulsion. The whole is then polymerized in an autoclave at a pressure up to 7 atmospheres by heating at 45° C. for about 24 hours.

The resulting dispersion is treated for about 1 hour with steam in order to remove any remainders of monomeric organic compounds. The dispersion is then coagulated by pouring it into about the same quantity of a 0.3 per cent aqueous solution of aluminium sulphate, whereupon sodium hydroxide is added until the water shows an alkaline reaction and the whole is heated at 80° C. for 3 hours. The coagulate is soaked off and dried. The resulting powder is soluble in benzene, acetone, and n-butyl acetate. The powder may also be pressed into moulds to form shaped articles, or it may be pressed at about 100° C., like celluloid, to form blocks which may be cut into plates or threads. The resulting plates may be formed into articles of any shape by drawing or blowing in the heat.

*Example 4*

100 kilograms of vinyl chloride and 20 kilograms of vinyl propionate are emulsified in 500 kilograms of water containing 1 per cent of the sodium salt of hydroxy-octodecane sulphonic acid and 1 per cent of a 10 per cent solution of peracetic acid in glacial acetic acid. The resulting emulsion is heated at 50° C. for about 48 hours in a closed vessel. The latex obtained is coagulated by cooling to 8° below zero C., whereupon 300 kilograms of an aqueous 2 per cent solution of caustic soda are added, and the whole is heated at 60° C. for 1 hour. The coagulate is filtered off after cooling and washed out with water, until the product has but a slight alkaline reaction.

*Example 5*

100 kilograms of vinyl chloride and 15 kilograms of vinyl butyrate are emulsified in 350 kilograms of water containing 0.5 per cent of a 30 per cent aqueous solution of hydrogen peroxide, 1 per cent of hydroxy octodecane sulphonic acid sodium salt and 0.1 per cent of lithium borate. The emulsion is heated at 55° C. for about 48 hours. After cooling, 350 kilograms of a 0.3 per cent aqueous solution of aluminium sulphate are added in order to coagulate the latex obtained, and then 350 kilograms of an aqueous 0.7 per cent solution of sodium hydroxide are mixed to the dispersion, the hole being then heated up to 60° C., filtered off and washed with water until the filtrate is neutral. The powder thus obtained may be moulded to form very elastic and transparent articles.

What we claim is:—

1. In the production of polymerization products consisting of vinyl halides, the step which comprises carrying out the polymerization with aqueous emulsions of the said halides in a closed vessel.

2. In the production of polymerization products, consisting of vinyl halides, the step which comprises carrying out the polymerization with aqueous emulsions of the said halides in a closed vessel at a temperature between about 35° and about 80° C.

3. In the production of polymerization products consisting of vinyl halides, the step which comprises carrying out the polymerization with aqueous emulsions of the said halides in a closed vessel at a temperature between about 35° and about 80° C. in the presence of nascent oxygen.

4. In the production of polymerization products consisting of vinyl halides, the step which comprises carrying out the polymerization with aqueous emulsions of the said halides in a closed vessel at a temperature between about 35° and 80° C. in the presence of nascent oxygen and at a hydrogen-ion concentration between pH= about 1.5 and pH=about 5.

5. In the production of polymerization products consisting of vinyl halides, the step which comprises carrying out the polymerization with aqueous emulsions of the said halides in a closed vessel at a temperature between about 35° and about 80° C. in the presence of nascent oxygen and at a hydrogen-ion concentration between pH=about 2.5 and pH=about 3.

6. In the production of polymerization products consisting of vinyl halides, the step which comprises carrying out the polymerization with aqueous emulsions of the said halides in a closed vessel at a temperature between about 35° and about 80° C. in the presence of peracetic acid.

7. In the production of polymerization products consisting of vinyl halides, the step which comprises carrying out the polymerization in a closed vessel with aqueous emulsions of the said halides, coagulating the resulting latex and treating the resulting product with aqueous alkali.

8. In the production of polymerization products consisting of vinyl chloride, the step which comprises carrying out the polymerization in a closed vessel with aqueous emulsions of vinyl chloride which are free from iron compounds.

9. In the production of polymerization products consisting of vinyl halides the step which comprises carrying out the polymerization in a closed vessel with aqueous emulsions of the said halides, coagulating the resulting latex and treating the resulting product with aqueous alkali at temperatures between about 60° and 95° C.

10. In the production of polymerization products consisting of vinyl chloride the step which comprises carrying out the polymerization in a closed vessel with aqueous emulsions of vinyl chloride which are free from iron compounds, coagulating the resulting latex and treating the resulting product with aqueous alkali.

11. In the production of polymerization products consisting of vinyl chloride the step which comprises carrying out the polymerization in a closed vessel with aqueous emulsions of vinyl chloride which are free from iron compounds, coagulating the resulting latex and treating the resulting product with aqueous alkali at temperatures between about 60–95° C.

HERMANN MARK.
HANS FIKENTSCHER.
JOSEF HENGSTENBERG.
GEORG v. SÜSICH.